(12) United States Patent
Khoshaba et al.

(10) Patent No.: US 7,539,379 B2
(45) Date of Patent: May 26, 2009

(54) ELECTRONIC CABLE SIGNATURE

(75) Inventors: Shadi Khoshaba, Skokie, IL (US);
Bruce Barnes, Crystal Lake, IL (US);
Wayne Heinmiller, Elgin, IL (US);
Nikhil Marathe, Chicago, IL (US);
Chuck Stahulak, Chicago, IL (US);
Henry Towster, Barrington, IL (US)

(73) Assignee: AT&T Intellectual Property I, L.P., Reno, NV (US)

( * ) Notice: Subject to any disclaimer, the term of this patent is extended or adjusted under 35 U.S.C. 154(b) by 0 days.

(21) Appl. No.: 11/345,603

(22) Filed: Feb. 1, 2006

(65) Prior Publication Data
US 2007/0189678 A1    Aug. 16, 2007

(51) Int. Cl.
*G02B 6/44* (2006.01)
(52) U.S. Cl. .................. 385/100; 385/101; 385/102
(58) Field of Classification Search .......... 385/100–114
See application file for complete search history.

(56) References Cited

U.S. PATENT DOCUMENTS

| | | | | |
|---|---|---|---|---|
| 5,418,878 A | * | 5/1995 | Sass et al. ................... | 385/101 |
| 5,539,851 A | * | 7/1996 | Taylor et al. ................. | 385/101 |
| 6,236,789 B1 | * | 5/2001 | Fitz ............................. | 385/101 |
| 6,246,821 B1 | * | 6/2001 | Hemken et al. ............. | 385/101 |
| 6,463,198 B1 | * | 10/2002 | Coleman et al. ............ | 385/101 |
| 6,618,526 B2 | * | 9/2003 | Jackman et al. ............. | 385/102 |
| 7,085,457 B2 | * | 8/2006 | Lancaster et al. ........... | 385/101 |
| 7,272,281 B2 | * | 9/2007 | Stahulak et al. ............. | 385/101 |

* cited by examiner

*Primary Examiner*—Sung H Pak
*Assistant Examiner*—Daniel Petkovsek
(74) *Attorney, Agent, or Firm*—Toler Law Group

(57) ABSTRACT

Optical fiber cable from a Central Office (CO) to a Service Area Interface (SAI) Optical Line Terminal (OLT) box may have a plurality of optical fibers, each fiber having at least one conductive sheath to can propagate an identifying signal. Optical fibers that emit a signal with identifying information, or other useful information, may be advantageous when, for example, the fiber optic cable holds fibers owned by more than one content or service provider. A further advantage may be that a signal may be designated to a particular address, thereby facilitating the installation of fiber optic service to a customer.

30 Claims, 8 Drawing Sheets

ELECTRONIC CABLE SIGNATURE

FIELD OF THE DISCLOSURE

The present disclosure relates to optical fiber, and in particular to optical fiber having one or more signal-transmitting sheaths around a fiber optic core such that the sheaths convey a signal associated with the optical fiber.

BACKGROUND

A fiber optic cable may typically contain a plurality of bundles of optical fibers, each bundle having from dozens to hundreds of optical fibers. Each optical fiber typically has a fiber optic core consisting of a glass tube with refractive properties selected to contain electromagnetic transmissions. Radiating concentrically from the core may be a plurality of layers, often of alternating dielectric and conductive materials, housed in a protective jacket, which forms the exterior concentric layer of the fiber. For example, one layer might consist of a hydroscopic material to exclude water from the cable to keep the cable dry, while another layer might consist of an insulator to protect the cable from electrical surges or lightning hits.

Additionally, one or more protective sheaths are often among the layers interior to the jacket. One typical purpose of the sheaths is to stiffen the cable so that the cable cannot bend so far as to damage the glass fiber optical core. The sheaths are frequently composed of copper fiber that is suitably disposed around an interior layer. It is not uncommon that one or more sheaths are composed of braided copper wires formed into a tube, when viewed in isolation from the cable.

A fiber optic cable may contain from dozens to hundreds of optical fibers. The fibers may be owned by more than one service or content provider and individual fibers may each terminate at a distinct address. Often the cable is buried underground. It would be advantageous, therefore, to be able to identify one or more of the fibers by owner or terminus destination without having to dig up the cable.

BRIEF DESCRIPTION OF THE DRAWINGS

The detailed description that follows, by way of non-limiting examples of embodiments, makes reference to the noted drawings in which reference numerals represent the same parts throughout the several views of the drawings, and in which.

DETAILED DESCRIPTION

In view of the foregoing, through one or more various aspects, embodiments and/or specific features or sub-components, the present disclosure is thus intended to bring out one or more of the advantages that will be evident from the description. The present disclosure makes reference to one or more specific embodiments by way of illustration and example. It is understood, therefore, that the terminology, examples, drawings and embodiments are illustrative and are not intended to limit the scope of the disclosure.

Optical fiber cable from a Central Office (CO) to a Service Area Interface (SAI) Optical Line Terminal (OLT) box may have a plurality of optical fibers, each fiber having at least one conductive sheath that can carry an identifying signal, which may be advantageous when, for example, the optical fiber cable holds fibers owned by more than one content or service provider. A further advantage may be that a signal may be designated to a particular address, thereby facilitating the installation of fiber optic service to a customer.

Although the present disclosure describes copper or other metallic sheaths, it will be recognized by those skilled in the art that a signal of the present disclosure may be propagated by a non-metalic conductor. For example, certain plastics, rubbers and ceramics are known to have conductive properties and may be adapted to propagate a signal of the present invention. Accordingly, fiber optic cable covers and optical fiber jackets may be adapted to convey a signal in addition or alternatively to the optical fiber sheath.

Figure 1:
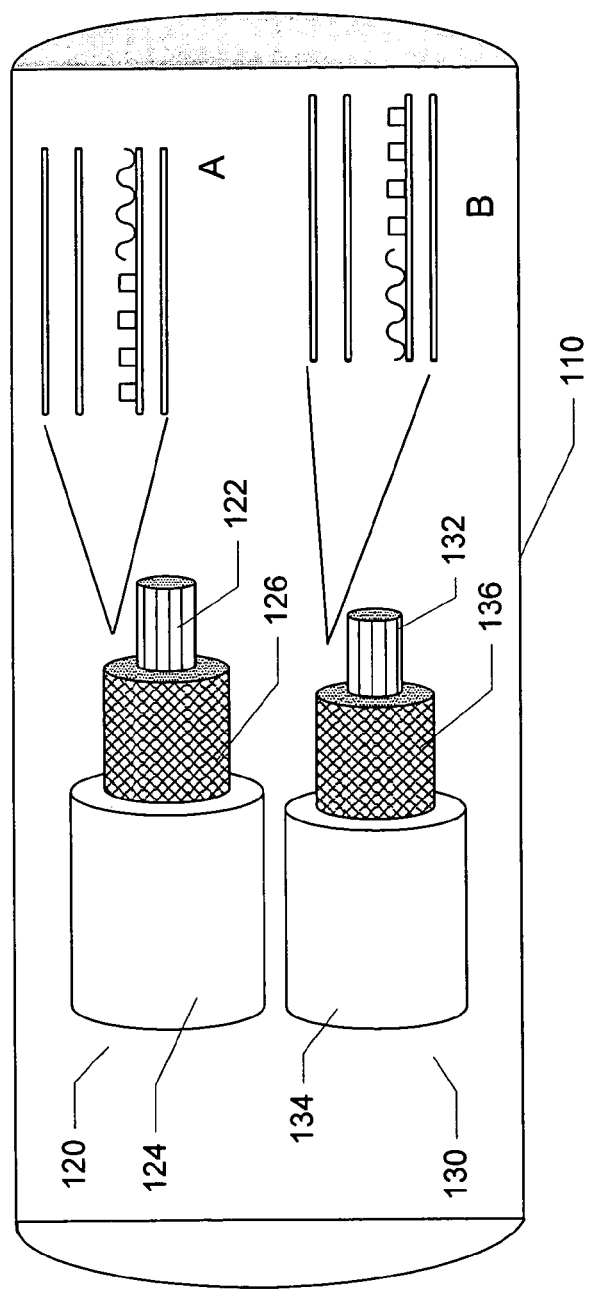
FIG. 1 is a diagrammatic illustration of a fiber optic cable of a specific exemplary embodiment of the present disclosure.

FIG. 1 is a diagrammatic illustration of an optical fiber of a specific exemplary embodiment of the present disclosure. The embodiment of FIG. 1A represents an optical fiber 110 housing a plurality of fiber optic fibers 120, 130. Each fiber 120, 130, has an optical core 122, 132; jacket 124, 134; and insulated conductive signal-emitting sheath 126, 136; respectively. Sheath 126 may propagate a signal in a first phase or having a first profile, such as waveform profile A. Similarly, sheath 136 may propagate a signal in a second phase or having a second profile, such as waveform profile B. Advantageously, in the case, for example, where a fiber optic cable carries a plurality of optical fibers, one may readily distinguish one fiber 126 from another fiber 136 by detecting a selected distinctive signal profile from the fiber associated with the selected signal profile.

Figure 2:
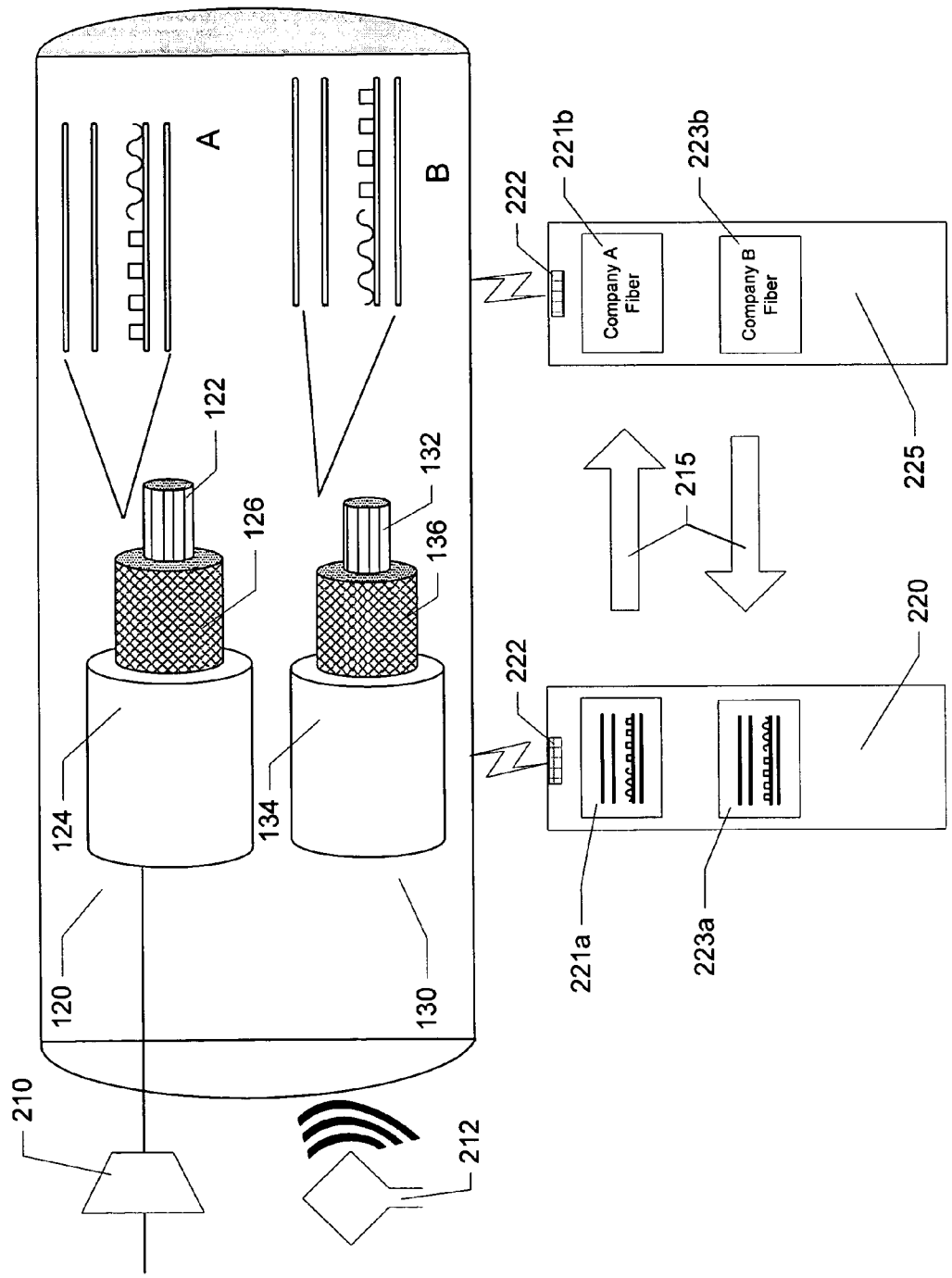
FIG. 2 is a diagrammatic illustration of a specific exemplary embodiment of a system of the present disclosure.

FIG. 2 is a diagrammatic illustration of a specific exemplary embodiment of a system of the present disclosure. Fiber optic cable 110 is presented here as depicted in FIG. 1, above. One or more signal transmitter 210 transmits one or more signals via sheath 126 of fiber 120. One of the signals transmitted via sheath 126 may carry information about fiber 120, or have a profile A that is uniquely associated with fiber 120.

Alternatively or additionally, one or more antenna 212 may be adapted to induce a signal into, for example, sheath 136 of optical fiber 130. One of the signals transmitted via sheath 136 may carry information about fiber 130, or have a profile B that is uniquely associated with fiber 130.

Accordingly, detector 220 detects one or more signal profiles 221a, 223a. Signal detection by detector 220 may be achieved wirelessly, for example, by passing detector 220 in the proximity of cable 110 within the detection limits of the one or more signals emitted by fibers 120, 130. Detector 220 may have sensor 222 to sense one or more wireless signal from cable 110. Signal profile A may be displayed at 223a of detector 220, and signal profile B may be displayed at 221a of detector 220.

Additionally or alternatively, detector 225 may provide a programmable machine such as a microprocessor, and machine-readable media containing instructions executable by the microprocessor to transform signal profiles 221a and 223a into information such as "Company B Fiber" 221b for fiber 130 and "Company A Fiber" 223b for fiber 120. Of course, it will be evident to those skilled in the art that the information displayed by detector 220/225 may not be limited to the example of FIG. 2. For example, in addition to identification, the information displayed may also include routing information, source and terminus information, information concerning the condition or integrity of the fiber, service history, and so forth. Arrows 215 are intended to suggest that detector 220 and detector 225 may, indeed, be the same device and that display of the information 221a/223a and 221b/223b may be optionally and selectively toggled back forth.

Figure 3:
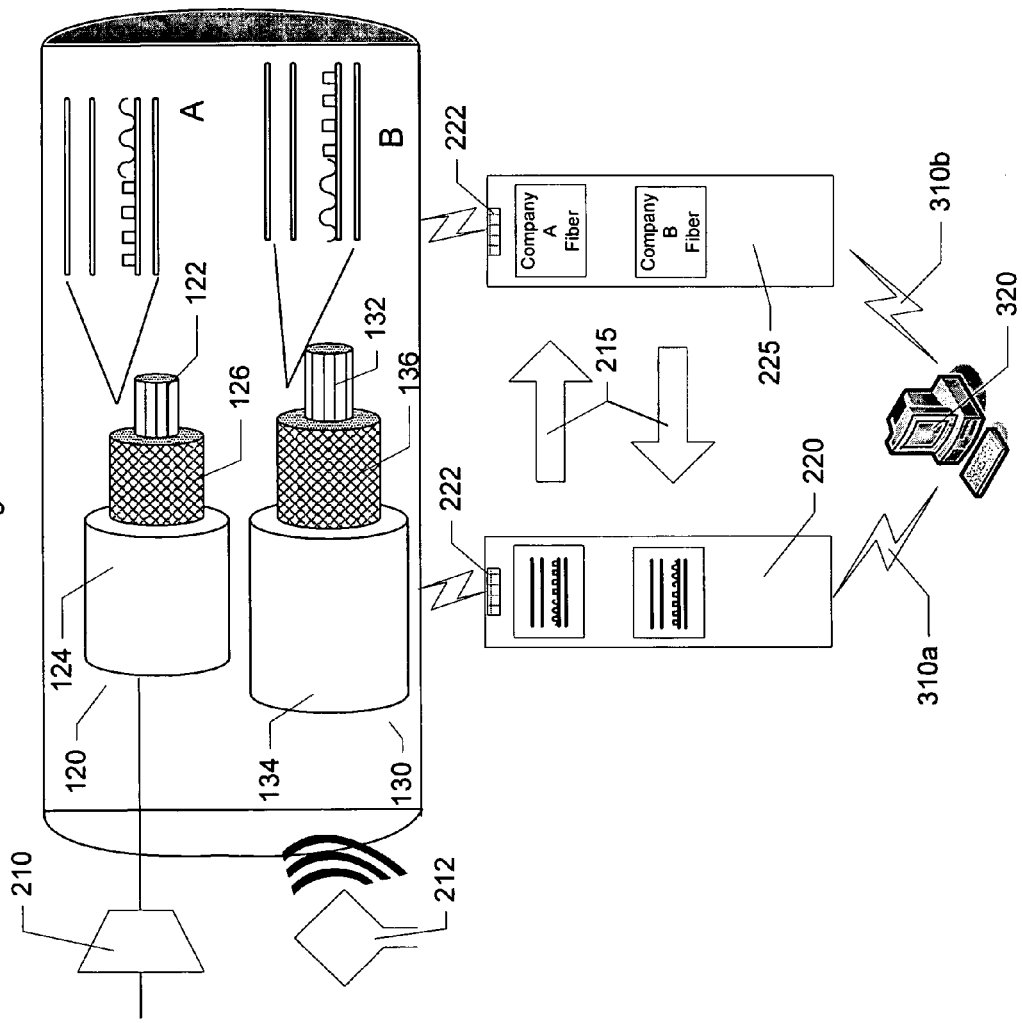
FIG. 3 is a diagrammatic illustration of an alternative specific exemplary embodiment of a system of the present disclosure.

FIG. 3 is a diagrammatic illustration of an alternative specific exemplary embodiment of a system of the present disclosure. In the system of FIG. 3, information obtained by detector 220/225 may be communicated 310a, 310b to computer 320. A system of FIG. 3 may be advantageous, for example, if the information may be processed by software installed on or accessible to computer 320, or if the information simply needs to be stored in a memory larger that available in detector 220/225 or in a memory at a selected location.

Figure 4:
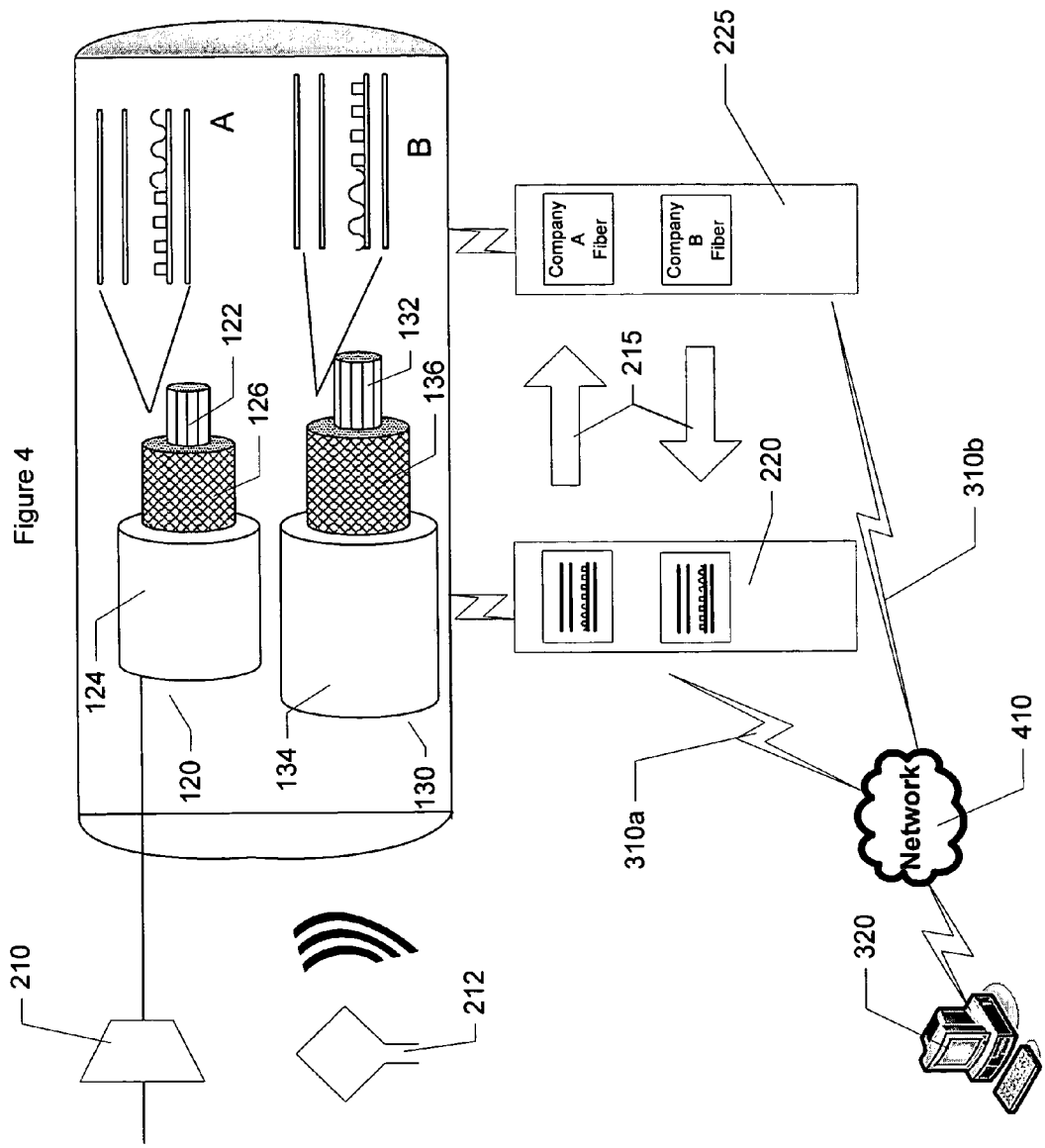
FIG. 4 is a diagrammatic illustration of another alternative specific exemplary embodiment of a system of the present disclosure.

FIG. 4 is a diagrammatic illustration of another alternative specific exemplary embodiment of a system of the present disclosure. In the embodiment of FIG. 4, the information from detector 220/225 may be transmitted 310a, 310b via network 410 to computer 320. Network 410 may include but not necessarily be limited to, a portion which includes the Internet; a virtual private network (VPN); public switched telephony (PSTN); and a wireless network, for example. The wireless network may include, for example, cellular, Bluetooth, or WiFi technology.

Figure 5:
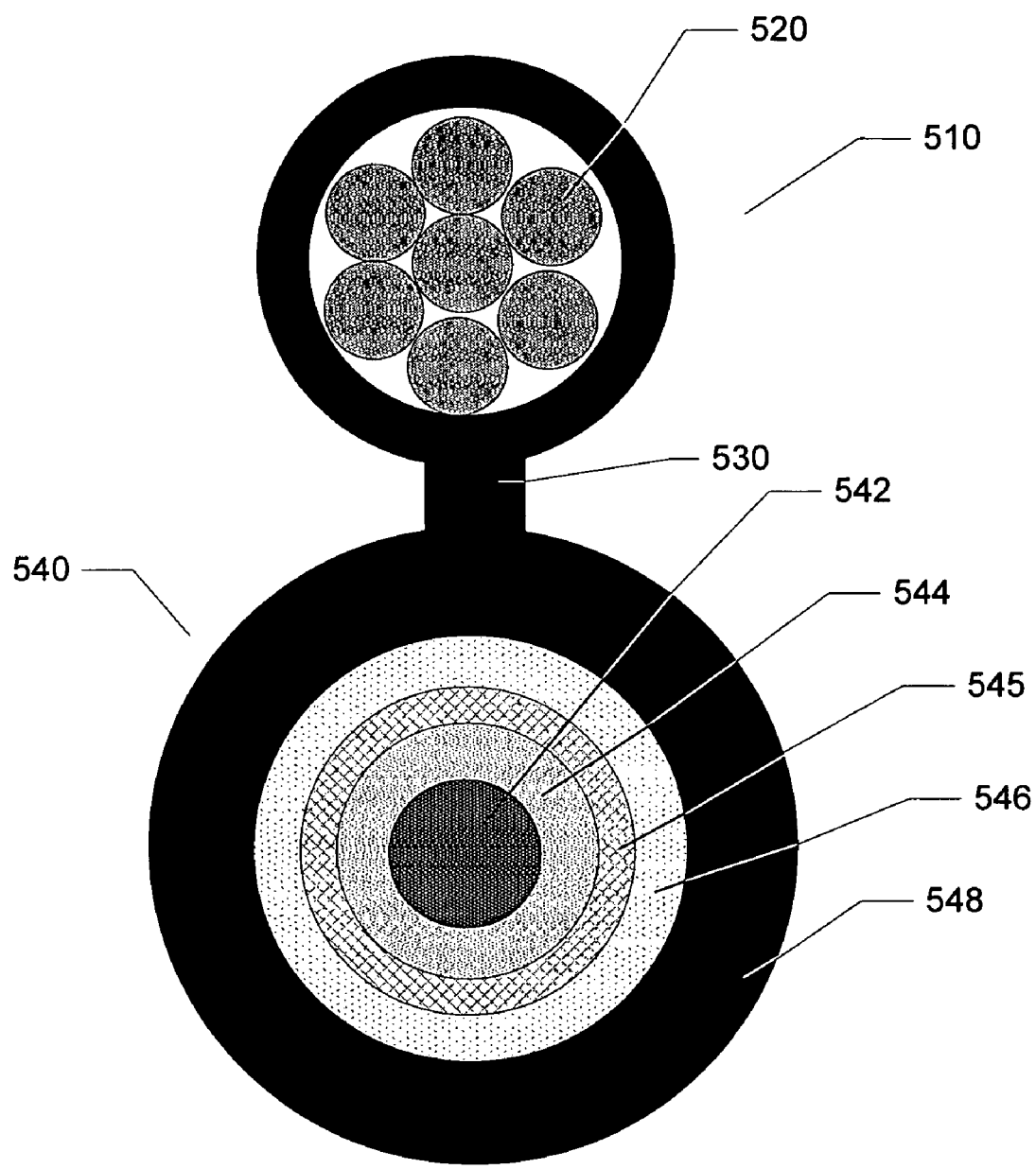
FIG. 5 is a diagrammatic illustration of a fiber optic cable of still another alternative specific exemplary embodiment of the present disclosure.

FIG. 5 is a diagrammatic illustration of a fiber optic cable of still another alternative specific exemplary embodiment of the present disclosure. A cable of FIG. 5 may provide portion 510 to carry so-called "stranded wire(s)" 520 and portion 540 to carry one or more fibers. Portion 510 and portion 540 may be connected by messenger portion 530. Portion 540 may include, for example, tube filling compound 542, loose tube 544, cable filling compound 545, steel tape coated with polyethylene (PE) 546, and PE jacket 548.

Figure 6:
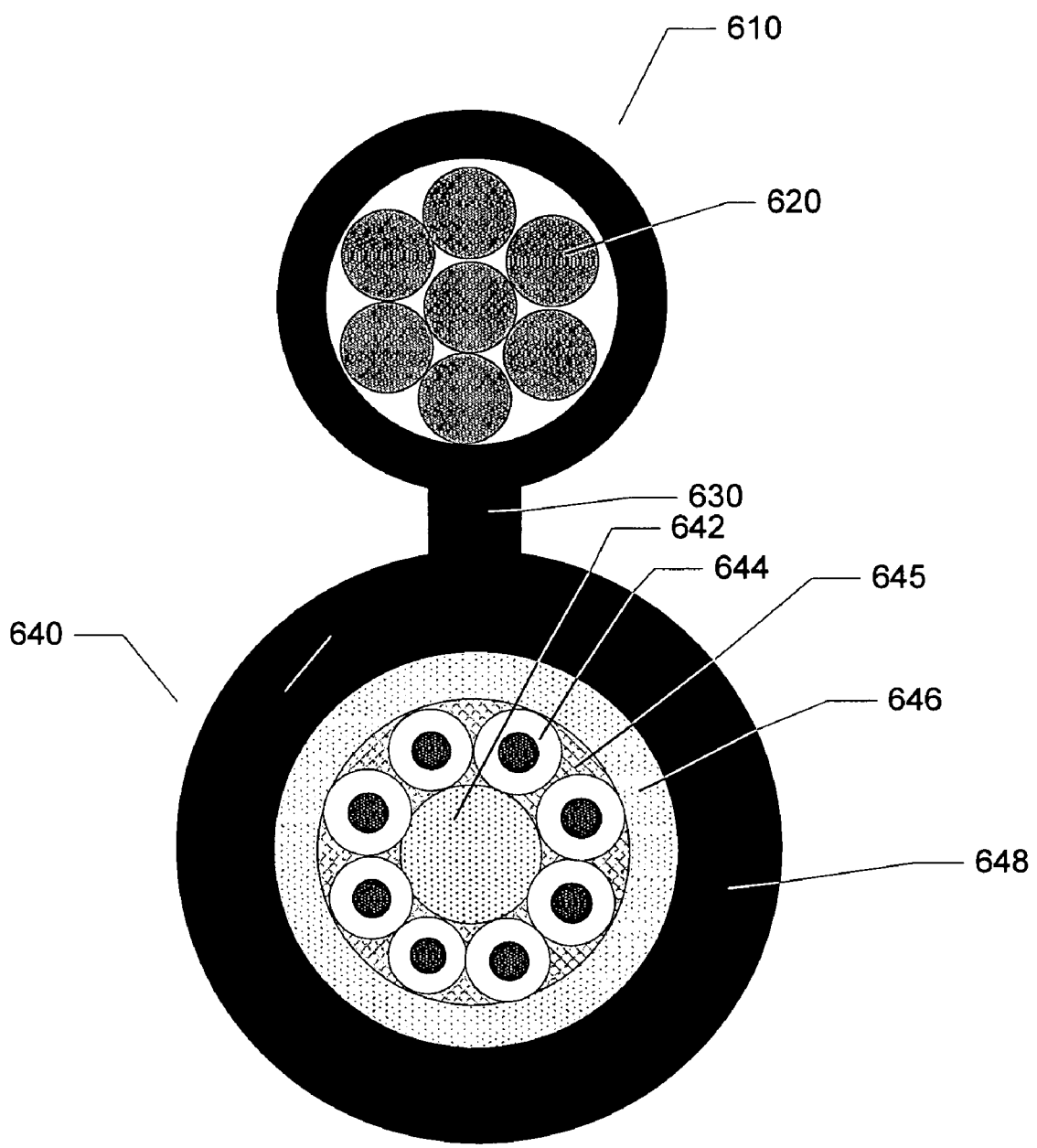
FIG. 6 is a diagrammatic illustration of a fiber optic cable of a further alternative specific exemplary embodiment of the present disclosure.

FIG. 6 is a diagrammatic illustration of a fiber optic cable of a further alternative specific exemplary embodiment of the present disclosure. Similar to the embodiment of FIG. 5, a cable of FIG. 6 may provide portion 610 to carry cable(s) 620 and portion 640 to carry fiber(s) 641. Portion 610 and portion 640 may be connected by messenger portion 630. Fibers 641 may be disposed around strength member 642 and be covered by tape or sheath 644. Cable filling compound may fill space 645 and be contained by tube 646, which in turn is protected by PE jacket 648.

Figure 7:
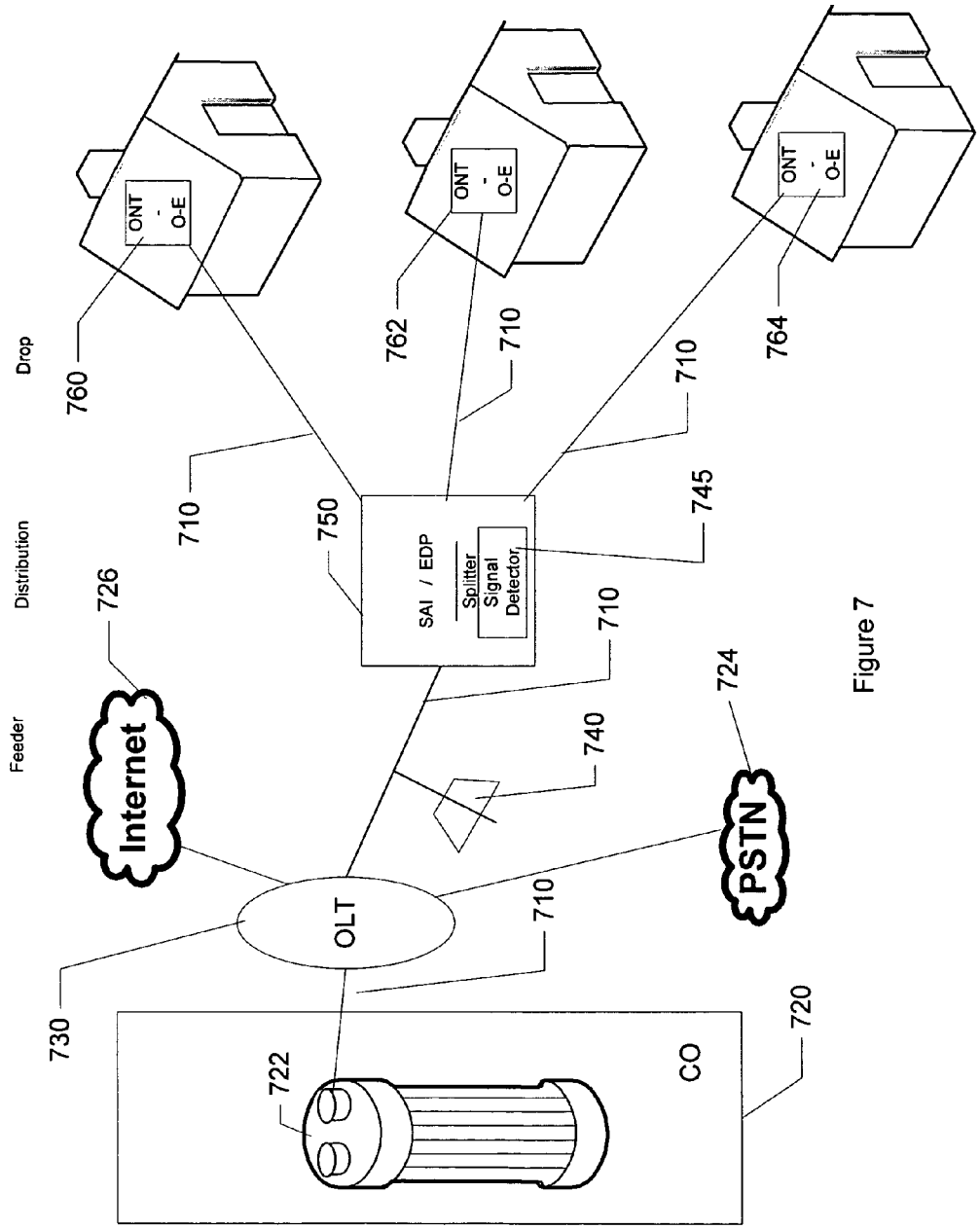
FIG. 7 is a diagrammatic illustration of a specific exemplary embodiment of a network of the present disclosure.

FIG. 7 is a diagrammatic illustration of a specific exemplary embodiment of a network of the present disclosure. The network may include fiber optic cabling 710 containing one or more sheaths adapted to carry power as described above. Cabling 710 may connect two or more components of the network, such as for example CO 720, OLT 730, signal source 740 connected to one or more insulated sheaths of cable 710, as described above, SAI 750, and ONTs 760, 762, 764 such as residences or office buildings. Signal source 740 is depicted generically here, but will be understood to contemplate signal source 210 attached to one or more of the sheaths of cable 710 and induction antenna 212 in wireless communication with one or more of the sheaths of cable 710. Central Office 720 may include fiber optic tower 722, disclosed here to provide an example of a source of a fiber optic transmission carried by cable 710.

Although shown in FIG. 7 as being located exterior to CO 720, it will be understood that one or more signal source 740 may be connected to an insulated conductive sheath of cable 710 at any point, including within CO 720. Signal source 740 may connected to an insulated conductive sheath of the present disclosure by any one of a number of suitable means.

OLT 750 may include the optical interfaces to the outside plant, as well as interfaces to the core networks, such as PSTN 724, ATM, Internet 726 or local media servers. The feeder section of the network, also described as the service area, may include up to 400 homes or buildings. The feeder cable, which may contain dozens to hundreds of fibers, may be aerial or buried along the feeder route.

The portion of the network between the feeder and the drop section may be thought of as beginning with the SAI and ending at the end distribution point (EDP). This distribution portion may include the splitters, splitter housings, fiber, conduit, splices and man- or hand-holes. The EDP may include a physical pedestal close to servicing subscriber premises. The drop section may start at the EDP and end at the subscriber. It may include the optical network terminal (ONT) an optical-to-electric (O-E) converter at the subscriber premises. The ONT terminates the fiber, decodes and interprets the signal, and passes the results to different outputs such as voice, data or video.

A signal conveyed by one or more of the sheaths in one or more of the optical fibers in the fiber optic cable of the network may be detected wirelessly at any selected point along the cable with a suitably adapted detector 745, as described above. Additionally or alternatively, signal detector 745 may be installed or otherwise incorporated at any one or more of the network components. For example, one or more detectors 745 may be situated at each splitter to verify that the correct fiber is routed to the intended ONT. Likewise, although not shown in FIG. 7, it will be evident to those skilled in the art that each ONT 760, 762, 764 may be equipped with a detector 745 to verify that the terminus is connected to the network with the intend fiber. A detector at a network component may optionally be a wireless detector or may be physically connected to the sheath to detect the signal(s). Such a detector may further be adapted to optionally toggle between wireless and physical detection modes.

The present disclosure contemplates embodiments in which the conductive material of the insulated conductive sheath (or portion thereof) includes a special conductive material. For example, metal conductors such as copper may include copper that has been doped in the manufacturing process to provide a conductor having specified characteristic. Similarly, certain advantageous metal alloys may be selected for inclusion in the conductive material.

Figure 8:
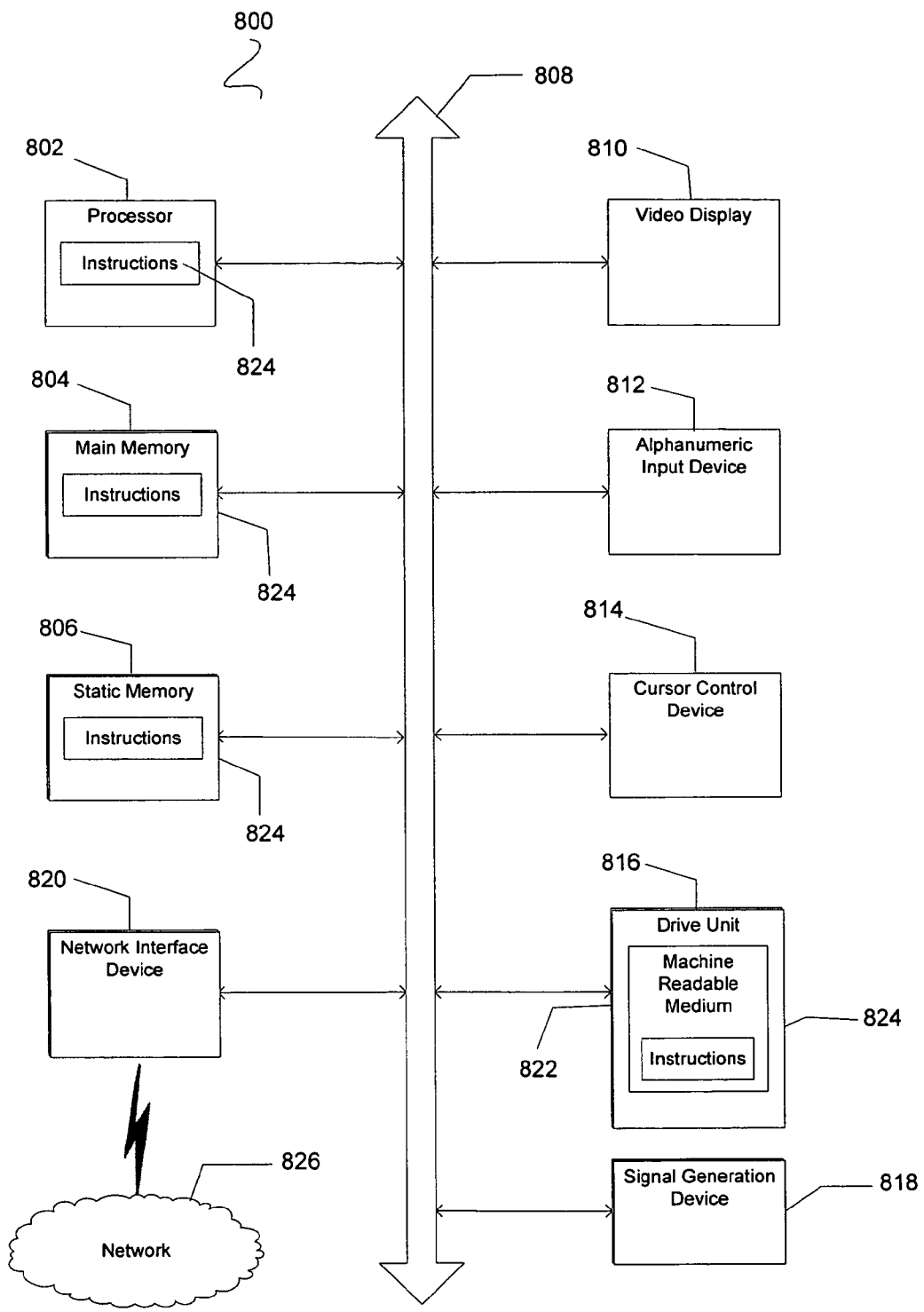
FIG. 8 is a diagrammatic representation of a machine in the form of a computer system 800 within which a set of instructions, when executed, may cause the machine to perform any one or more of the methodologies of the present disclosure.

In accordance with various embodiments of the present disclosure, the methods described herein are intended for operation as software programs running on a programmable machine such as a computer processor. FIG. 8 is a diagrammatic representation of a machine in the form of a computer system 800 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a set-top box (STB), a Personal Digital Assistant (PDA), a cellular telephone, a mobile device, a palmtop computer, a laptop computer, a desktop computer, a personal digital assistant, a communications device, a wireless telephone, a landline telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 800 may include a processor 802 (e.g., a central processing unit (CPU), a graphics processing unit (GPU), or both), a main memory 804 and a static memory 806, which communicate with each other via a bus 808. The computer system 800 may further include a video display unit 810 (e.g., a liquid crystal display (LCD), a flat panel, a solid state display, or a cathode ray tube (CRT)). The computer system 800 may include an input device 812 (e.g., a keyboard), a cursor control device 814 (e.g., a mouse), a disk drive unit 816, a signal generation device 818 (e.g., a speaker or remote control) and a network interface device 820.

The disk drive unit 816 may include a machine-readable medium 822 on which is stored one or more sets of instructions (e.g., software 824) embodying any one or more of the methodologies or functions described herein, including those methods illustrated in herein above. The instructions 824 may also reside, completely or at least partially, within the main memory 804, the static memory 806, and/or within the processor 802 during execution thereof by the computer system 800. The main memory 804 and the processor 802 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 824, or that which receives and executes instructions 824 from a propagated signal so that a device connected to a network environment 826 can send or receive voice, video or data, and to communicate over the network 826 using the instructions 824. The instructions 824 may further be transmitted or received over a network 826 via the network interface device 820.

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of embodiments as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to e-mail or other self-contained information archive or set of archives is considered a distribution medium equivalent to a tangible storage medium. The disclosure is considered to include a tangible storage medium or distribution medium, including a propagated signal, as listed herein and including art-recognized equivalents and successor media, in which the software implementations herein are stored.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the claims reflect, inventive subject matter lies in less than all features of a single disclosed embodiment. Thus the following claims are hereby incorporated into the Detailed Description, with each claim standing on its own as a separate embodiment.

The description has made reference to several exemplary embodiments. It is understood, however, that the words that have been used are words of description and illustration, rather than words of limitation. Changes may be made within the purview of the appended claims, as presently stated and as amended, without departing from the scope and spirit of the disclosure in all its aspects. Although description makes reference to particular means, materials and embodiments, the disclosure is not intended to be limited to the particulars disclosed; rather, the disclosure extends to all functionally equivalent technologies, structures, methods and uses such as are within the scope of the appended claims.

We claim:

1. An optical fiber construction comprising:
   at least one fiber optic core;
   an outer jacket housing the at least one fiber optic core; and
   one or more sheaths between the jacket and the at least one fiber optic core, at least one of the sheaths surrounding a respective fiber optic core and comprising one or more non-metallic signal conductive portions for propagating an information signal associated with and identifying the respective fiber optic core through the non-metallic signal conductive portions.

2. The construction of claim 1, wherein the one or more of the non-metallic signal conductive portions are physically connected to a signal generator.

3. The construction of claim 1, wherein the one or more of the non-metallic signal conductive portions are wirelessly connected to a signal generator via a signal induction field.

4. The construction of claim 1, wherein the at least one of the sheaths comprises a braid of multiple strands and wherein at least one of the strands comprises a non-metallic signal conductive portion connected to a signal generator.

5. The construction of claim 1, further comprising a dielectric layer between at least one of the sheaths and the fiber optic core.

6. The construction of claim 1, wherein at least one of the sheaths comprises a conductive material selected to at least approximate one or more desired performance characteristics.

7. The optical fiber construction of claim 1, wherein the outer jacket is connected to a signal generator to carry the information signal.

8. A fiber optic cable system, the system comprising:
   a fiber optic cable housing a plurality of optical fibers, each optical fiber further comprising a fiber optic core, an outer jacket and one or more sheaths between the fiber optic core and the outer jacket, wherein at least one of the sheaths comprises a non-metallic signal conductive portion for propagating an information signal associated with and identifying the respective optical fiber through the non-metallic signal conductive portion.

9. The system of claim 8, further comprising a signal source in communication with the one or more of the sheaths to induce a signal into the at least one of the sheaths.

10. The system of claim 8, further comprising a detector to detect an emitted signal from the at least one of the sheaths.

11. The system of claim 10, wherein the detector further comprises a display to display information that relates to the detected signal.

12. The system of claim 11, wherein the information comprises a waveform profile of the signal.

13. The system of claim 11, wherein the information comprises data.

14. The system of claim 9, further comprising a computer in communication with the detector.

15. The system of claim 8, further comprising a display to display information that relates to the detected signal.

16. The system of claim 15, wherein the information comprises a waveform profile of the signal.

17. The system of claim 15, wherein the information comprises data.

18. The system of claim 8, wherein one or more of the optical fibers in the cable emits an identifying signal.

19. The system of claim 8, wherein the outer jacket is connected to a signal generator to carry the information signal.

20. A fiber optic network having one or more network components, the network comprising:
   one or more fiber optic cables, each of the one or more fiber optic cables including one or more optical fibers, each optical fiber further including a fiber optic core and one or more non-metallic signal conductive sheaths surrounding the core; and
   one or more signal sources connected to the one or more of the non-metallic signal conductive sheaths, at least one of the one or more non-metallic signal conductive sheaths conveys an information signal associated with the respective optical fiber;
   wherein the one or more of the optical fibers connects to at least one of the network components.

21. The network of claim 20, wherein the one or more network components comprise one or more fiber optic transmitters.

22. The network of claim 20, wherein the one or more network components comprise one or more central offices.

23. The network of claim 20, wherein the one or more network components comprise one or more optical line terminals.

24. The network of claim 20, wherein the one or more network components comprise one or more service area interfaces.

25. The network of claim 20, wherein the one or more network components comprise one or more end distribution points.

26. The network of claim 20, wherein the one or more network components comprise one or more optical network terminals.

27. The network of claim 20, wherein the one or more network components comprise one or more optical-to-electric converters.

28. The network of claim 20, further comprising one or more signal detectors to detect one or more information signals conveyed by the at least one of the sheaths.

29. The optical fiber construction of claim 20, wherein the at least one of the sheaths that conveys the information signal is between the fiber optic core and an outer jacket housing the fiber optic core.

30. The optical fiber construction of claim 20, wherein the at least one of the sheaths that conveys the information signal is an outer jacket housing the fiber optic core.

* * * * *